United States Patent [19]

Sklar

[11] 3,711,583

[45] Jan. 16, 1973

[54] METHOD OF PRODUCING POLYAMIDE MEMBRANES AND RIGID FOAMED PRODUCTS

[76] Inventor: Lawrence A. Sklar, 14697 Northeast 18th Avenue, North Miami, Fla. 33161

[22] Filed: Dec. 31, 1969

[21] Appl. No.: 889,331

Related U.S. Application Data

[63] Continuation-in-part of Ser. No. 560,124, June 24, 1966, abandoned.

[52] U.S. Cl. ............264/49, 260/2.5 M, 260/2.5 N, 260/22 N, 264/288
[51] Int. Cl. ........B29d 7/20, B29d 7/24, B29d 27/00, C08g 20/40
[58] Field of Search.................................264/41, 49, 289, Dig. 61, Dig. 62, 264/288; 260/2.5 M, 78 R, 78 A, 2.5 N, 72 N

[56] References Cited

UNITED STATES PATENTS

| | | | |
|---|---|---|---|
| 2,783,894 | 3/1957 | Lovell et al. | 264/41 UX |
| 3,427,179 | 2/1969 | Davis | 264/41 M X |
| 2,071,250 | 2/1937 | Carothers | 260/78 A |
| 2,071,253 | 2/1937 | Carothers | 260/78 A |
| 2,130,948 | 9/1938 | Carothers | 260/28 R |
| 3,565,834 | 2/1971 | Dachs et al. | 260/2.5 N |

*Primary Examiner*—Philip E. Anderson
*Attorney*—Wayne C. Jaeschke

[57] ABSTRACT

Polyamide membranes of desired thickness are prepared by dissolving polyamide in HCl, admixing paraformaldehyde and then zinc chloride to produce a viscous paste, forming expanded gelatinous material by treatment with formaldehyde, curing this material and applying tensile stress thereto. Rigid, water insoluble, polyamide foam material is prepared by treating polyamide with concentrated solution of zinc chloride in HCl to make a gum-like solid and supernatant liquid, admixing 1,3,5-trioxane and the gum-like solid to make a homogeneous, light, and flowable paste which is then cured in a suitable mold at atmospheric conditions, preferably in the presence of weakly acidic water. The membranes are useful, e.g., for bandages and the nylon foam is useful, e.g., as a construction material, for trays, containers, etc.

9 Claims, 2 Drawings

METHOD OF PRODUCING POLYAMIDE MEMBRANES AND RIGID FOAMED PRODUCTS

This application is a continuation-in-part of my prior and co-pending application Ser. No. 560,124, filed June 24, 1966 and now abandoned.

The present invention relates to the production of novel polyamide products by new and useful methods. More specifically, in one aspect, the present invention relates to the production of unsupported, relatively thin, flexible, and vapor permeable sheets or membranes of polyamide material. In another aspect, the invention relates to the production of rigid, insoluble, polyamide foam materials.

A great variety of processes are known for the formation of useful products from nylon material. It is, of course, well known that nylon 66, for example, can be extruded from a melt into monofilaments or spun from a solution thereof in formic acid or phenol. When the filaments are cold drawn to about four times their original length, the molecules are oriented along the axis of the fiber resulting in fibers which are elastic and have a higher tensile strength than silk either in a dry or wet condition. By reason of the exceptional commercial success enjoyed by nylon filaments large and highly respected research organizations have expended extraordinary sums in time and money in the exploration of possible routes to obtain other semifinished as well as finished nylon products. Included in such exploration has been considerable efforts to realize in an economically practicable manner, relatively thin, i.e., between 1/16 - inch and 1/10,000 - inch, nylon sheets of high tensile strength. Unfortunately, the objectives of such efforts are not completely fulfilled in the prior art.

Not withstanding the foregoing, I have now discovered a novel and unobvious process for preparing relatively thin, flexible, polyamide membranes having high tensile strength, and, of essential importance for the novel uses which I have found for the product of this process, appreciable permeability with respect to fluids including both gaseous and liquid materials. That is to say, the polyamide membranes prepared in accordance with my novel process have a measurable and controllable rate of diffusion of gaseous material as well as liquid material, bi-directionally, through the intact membrane which can be expressed in terms of unit volume of fluid passing through a given unit of area of membrane surface per unit time. The rate of diffusion of gaseous material such as, e.g., oxygen, is, quite unexpectedly, substantially greater than the rate of diffusion of liquid material through the intact membrane making such membranes useful as means for diffusing gaseous material which can be retained on one side of a membrane into a liquid retained on the membrane surface, itself. In this regard the membranes of the present invention are shown to be useful in the controlled oxygenation of blood. The membranes of the present invention are shown to be useful as bandage material in covering wounds, particularly, as coverage for burns. Medication can be diffused inwardly through the inert membrane material while the gaseous products of biological decomposition diffuse outwardly away from the wound. Surprisingly, the fluid permeable material prepared in accordance with the process of the present invention appears from unaided visual observation thereof to be a thin, continuous film of the polyamide material, which in the case of certain relatively thin sheets which I have prepared, are completely transparent. The polyamide membranes of this invention can be prepared having a thickness between about one-sixteenth and about one ten-thousandth of an inch as desired. Such membranes can be prepared having superficial pores disposed on the surfaces thereof which impart a sponge-like appearance as well as resilience to the membrane. If desired, the membranes can likewise be prepared having a surface which appears to be perfectly smooth and regular by unaided visual observation. In general, however, the surface condition of the membrane which may be desired for the specific applications thereof does not alter the essential properties of the membranes.

Generally, the aforesaid membranes are prepared in accordance with the process of the present invention by dissolving a suitable polyamide material in hydrochloric acid solution, admixing solid formaldehyde-containing-material and then zinc chloride, in that order, with the resulting polyamide-acid solution in such proportions that a viscous paste is obtained. Formaldehyde solution is then contacted with the viscous paste for an extended period of time uner conditions which cause the formaldehyde to be absorbed in the viscous paste causing same to swell and to become an expanded, gelatinous material. Sufficient contact time between the gelatinous material and formaldehyde is permitted, preferably, such that maximum formaldehyde absorption occurs. The gel is then separated from any liquid formaldehyde which may be present, and at this point exhibits the properties of a viscous fluid. The gel is permitted to cure, preferably under atmospheric conditions, until such time as it exhibits a concurrence of properties which includes plastic adherence and resilience at which time it is worked into the membrane of the present invention by the application of tensile stress which causes elongation and essentially uniform reduction in thickness thereof.

I have also discovered that by varying the procedure herein before described for making the novel membranes, I can produce a new and useful rigid, polyamide foam material. The novel, rigid foam is substantially less dense than extruded or spun polyamides. However, the product foam is insuluble in water and common solvents and possesses great strength and shatter resistance. In accordance with the new and surprising method of preparation, the rigid polyamide foam can be molded under atmospheric conditions into any desired shape. For example, the rigid, polyamide foam is useful for construction materials, e.g., wall and ceiling panels and floor tiles. Additionally, the rigid foam material is capable of being sawed, drilled and sanded. Nails and screws can be permanently inserted into the material without splitting or damaging the material in any way. The nylon foam can also be used to make trays, containers of all typed, as packaging material, gasket material and the like.

Generally, the rigid polyamide foam is prepared in the following manner. A suitable polyamide is contacted with an acidic, concentrated solution of zinc chloride. The mixture is stirred until the polyamide is converted to a gum-like material covered by supernatant acid, zinc chloride solution. The gum-like material is then treated by adding solid formaldehyde-containing material until the gum swells and absorbs the supernatant liquid. At this point the material is homogeneous and has the consistency of a light, flowable paste. In order to achieve a light, flowable paste of optimum consistency, about one part by weight of solid formaldehyde-containing material is added for every part of polyamide. This ratio is not critical however. The light, flowable paste is poured into a suitable mold or form, (which should be acid resistant). The rigid, polyamide foam of this invention can be prepared from the above described paste simply by permitting it to set up in the form under atmospheric conditions. Preferably, in order to avoid formation of an undesirable skin on the surface of the final product, the paste is covered with weakly acidified water during the curing period which may take from 1 to 2 hours. When the rigid foam has set up, the product is leached with cold water to remove residual chemicals. The resulting rigid foam has the properties herein before described.

In order to achieve a rigid polyamide foam of desired density, zinc chloride: HCl: polyamide weight ratios between about 1:2:0.5 and about 1:8:4 are preferred. Increasing the relative amount of polyamide makes a foam product of greater density; and, correspondingly, decreasing the polyamide lowers the density of the foam product.

Reference is made to the two figures of the drawing which illustrate two preferred embodiments of the process of the present invention.

FIG. 1 illustrates the process for making polyamide membranes.

FIG. 2 illustrates the process for making rigid, polyamide foam.

The polyamide starting materials useful in the present invention are well known in the literature and are described in detail for example in U.S. Pat. Nos. 2,071,250, 2,071,253, and 2,130,948. These polymers are crystalline rather than resinous and are linear, long chain products of high molecular weight. The polyamides employed in the present invention include in addition to polyamides obtained solely from polyamide forming reactants, linear polymers containing recurring amide groups as an integral part of the main chain of atoms in the molecule, such as, e.g., the ester-amide interpolymers obtained from the inclusion of other bifunctional reactants with the polyamide-forming reactants. Upon hydrolysis with mineral acids the polyamides yield monomeric amide-forming reactants. For example, a polyamide derived from a diamine and a dibasic carboxylic acid yields upon hydrolysis thereof with hydochloric acid, the dibasic carboxylic acid and the diamine hydrochloride. Polyamides having an intrinsic viscosity, as defined in U.S. Pat. No. 2,130,948, of at least about 0.4 and preferably between about 0.5 and about 2.0 are most useful.

As the initial step in the process of making the novel membranes a suitable polyamide, preferably prepared in comminuted form, is contacted with sufficient hydrochloric acid solution to effect substantially complete dissolution thereof. For this purpose polyamide to hydrochloric acid ratios between about 0.1 and about 1 to 1 have been found useful. After the solution has been prepared, solid formaldehyde-containing material selected from the group consisting of the cyclic trimer, 1, 3, 5-trioxane, which is a crystalline material, and paraformaldehyde is admixed therewith. The addition of the solid formaldehyde at this point is essential in order to prevent degradation of the polyamide to lower molecular weight material. Such material additionally appears to improve the formation of the gelatinous material hereinafter described. Ratios of solid formaldehyde containing material to polyamide which have been found useful at this point in the process are between about 0.1 to 1 and about 0.5 to 1.

Following the introduction of the formaldehyde, sufficient zinc chloride is stirred into the resulting mixture until a smooth, viscous paste is obtained. It has been found that the specific reactant, namely, zinc chloride is required in order to produce a gelatinous material hereinafter described having suitable drawing properties for the purpose of making membranes in accordance with the present invention. It has likewise been found that the use of an insufficient amount of zinc chloride results in the preparation of gelatinous material having undesirable drawing properties. Therefore, zinc chloride to polyamide ratios of at least about 0.1 to 1 and preferably above about 0.5 to 1 are employed.

When a viscous paste has been prepared, it is than brought into contact with formaldehyde solution for a period of time sufficient to permit substantial saturation thereof by reason of absorption of the formaldehyde therein resulting in the production of an expanded gelatinous material. A preferable method of adding the formaldehyde solution to the viscous paste in order to produce the loose, workable gel useful for the purposes of the present invention comprises introducing the formaldehyde to the viscous paste, which may be contained in a suitable reaction vessel, over a protracted period of time while providing suitable stirring or agitation in order to permit absorption or "soaking up" of the formaldehyde in the interstices of the paste which appears to swell during the absorption period. Where the formaldehyde is added too rapidly or if insufficient contact time is provided a hard, unworkable gel is obtained. In accordance with the preferred method of addition, at a certain point which is readily observable, the gelatinous phase reaches its maximum capacity for formaldehyde retention and separation of a liquid formaldehyde phase is observed. Formaldehyde addition can be terminated at this point and then be separated from any supernatant liquid.

The gel produced in accordance with the above described procedure exhibits flow properties like those of a viscous fluid. That is to say, there appears to be little if any bonding between the particles comprising the mass and the rate of flow of the mass is proportional to the applied stress. The gel at this point will flow to some extent under its own weight, for example, if it is heaped as a mass on a smooth surface. The gel at this point is not yet suitable for working into the membranes of the present invention. It has been found that it is essential to cure the gel, e.g., by permitting it to stand under atmospheric conditions for a period of time until the gel undergoes a readily observable change from a viscous fluid to a mass exhibiting plastic properties. Under atmospheric conditions the curing time which is required usually varies between about one-half and about 1½ hours. It is contemplated that the curing time can be reduced by the application of temperatures above about room temperature up to about 150° or curing under reduced pressure conditions. As the material is cured contraction of the gel occurs and the material exhibits elasticity or resilience to a minor degree and plastic adherence is apparent. That is to say, in one aspect the mass behaves like modeling clay in that if a portion of the material is broken off from the remainder it can be reunited therewith by pressing it back into the mass. The material when deformed to a minor extent, e.g., 15 to 20 percent, will regain its original shape. It is essential that when the properties of plastic adherence and resilience concur in the mass, as can be readily demonstrated, for example, by hand testing the material in the above described manner, that the membranes be drawn therefrom during this period. Otherwise, the material upon additional curing loses its plastic properties becoming hard and unworkable. Thus, close observation and periodic testing of the mass is required during the curing operation in order to insure drawing of the membranes at the appropriate time.

It is essential that the gel cured in the above described manner be drawn into membranes by the application of tensile stress thereto. It has been found that the gel resists rolling and extruding methods. The application of compressive force to the gel actually causes it to become hard and unworkable. Therefore, in order to draw the membrane of the present invention tensile stress is applied to the mass either by hand or suitable machine and in either an intermittent or continuous fashion by engaging peripheral regions of the mass and applying force in a direction radially outward with respect to the center of the mass. The best results are obtained when the application of force is essentially uniform over the cross-sectional area of the mass. The uniform application of force to the mass can be accomplished by the use of a suitable rack or frame over which the membranes are disposed during application of the tensile stress causing elongation and uniform reduction in thickness thereof.

Subsequent to the formation of the membrane in the above described manner the acidic medium is removed therefrom by any suitable leaching procedure such as, e.g., leaching the membrane with relatively cold water, i.e., 40° – 60°F., over a protracted period of time. It has been found that relatively slow, cold water leaching of the membranes is preferable for the preparation of membranes to be employed in certain surgical application hereinafter described. Another method of removing the acidic medium comprises treating the membranes with a base such as sodium hydroxide and triethanol amine, for example, followed by souring with an acid and then water washing to remove the salts formed during the neutralization reaction. Such treatment yields a relatively smooth surface on each side of the membrane and the membranes produced thereby exhibit high tensile strength. Another method which can be employed where it is desirable to cause the formation of superficial pores resulting in a sponge like appearance of the surfaces of the final product comprises treatment with sodium bicarbonate, for example. The carbon dioxide which is released causes the above described pore formation and results in the preparation of membranes having exceptionally low effective thickness.

Having thus described the invention in general terms reference is now made to several specific examples of the above described procedure in order to provide a better understanding of the present invention although it is to be understood that the invention should not be construed as being unduly limited thereby.

EXAMPLE 1

Interpolyamide in the amount of 400 parts prepared from hexamethylene diammonium adipate and caprolactam in a ratio of 60:40, which had been ground to pass a 14 mesh screen, was dissolved in 600 parts of 38% HCl. 100 parts of 1,3,5 trioxane powder was added and stirred in. 200 parts of zinc chloride in granular form was then added and the mass was thoroughly agitated until a smooth past was formed. Liquid formaldehyde solution in a total amount of 1,300 parts was then added and stirred into the paste over a period of about one-half hour. The expanded gelatinous material which resulted was separated from liquid formaldehyde and allowed to set under atmospheric conditions for about one hour at which time the material appeared to be in suitable condition for working. Tension was applied to the mass, by hand, in as nearly a uniform manner as possible and when the material was sufficiently attenuated, the formation of the membrane was completed employing a small frame for the purpose of supporting the material being worked.

In the above described manner a thin, continuous film or membrane of polyamide material having the properties hereinbefore described and having a thickness of about one-thousandth inch was prepared. Residual chemical materials were removed from the membrane by leaching in cold water. The product was transparent.

The preferential vapor permeability of a membrane can be determined in a simple manner by measuring the change in PH of water retained on the cupped surface of known area of a membrane, when such membrane is situated in covering relationship over a container of aqueous ammonia of known concentration.

EXAMPLE 2

This example illustrates the preparation of rigid polyamide foam structure by another embodiment of the process of this invention.

One part zinc chloride in granular form was stirred into one part water to form a highly concentrated solution. The solution was permitted to cool down to about room temperature. Four parts of 38% HCl were then added. Two parts interpolyamide (same as example 1) were then stirred into the acid zinc chloride solution. The mixture forms a gum-like material with a supernatant liquid comprising acid zinc chloride. 1, 3, 5 - trioxane powder (2 parts) was added with mixing until the gum became swollen and absorbed all of the supernatant liquid. After addition of the trioxane was completed, the gum had the consistency of a smooth light and flowable paste. The paste was poured into a shallow acid resistant pan which was used as a mold for the final product. A weak (2 percent) aqueous solution of HCl was slowly poured over the top of the paste until it was completely covered. The mold was allowed to stand about two hours. The product was then removed from the pan, leached with cold water and dried.

The molded product had a rigid polyamide foam structure. The product was insoluble in water although it was capable of being wetted by and absorbing small quantities of water. The polyamide foam is substantially lighter (less dense) than conventional nylon. The foam can be cut by means of a saw and nails can be pounded into the foam without splitting it. On the other hand the foam is so tough and shatter resistant that repeated hammering failed to shatter or make substantial depressions in the foam.

The surface of the foam has a smooth surface conforming to the mold. A soft, velvet-like finish can be imparted to the polyamide foam by abrading the material with an emery stone or sandpaper.

Having thus described the invention, many modifications and alterations thereof will become apparent to those skilled in the art without departing from the spirit and scope thereof.

What is claimed is:

1. A process of preparing a polyamide membrane which comprises: preparing a solution of a crystalline linear and long chain high molecular weight polyamide in hydrochloric acid, admixing solid formaldehyde-containing material selected from the group consisting of 1, 3, 5 trioxane and paraformaldehyde and said solution in an amount sufficient to prevent substantial degradation thereof, admixing zinc chloride with the resulting solution until a viscous paste is obtained, contacting said viscous paste with formaldehyde solution for a period of time sufficient to form an expanded polyamide-containing gelatinous material, separating said gelatinous material from formaldehyde solution, curing said gelatinous material for a period of time sufficient to produce therefrom a material exhibiting properties including plastic adherence and resilience, and during the period of concurrence of such properties in said material elongating same by the application of essentially uniform tensile stress thereto to produce relatively thin, continuous, flexible, and vapor permeable polyamide membrane of a desired thickness, and removing residual chemicals from said membrane.

2. The process of claim 1 in which the polyamide to hydrochloric acid ratio is between about 0.1:1 and about 1:1.

3. The process of claim 1 in which the ratio of solid formaldehyde-containing material to polyamide is between about 0.1:1 and about 0.5:1.

4. The process of claim 1 in which the zinc chloride to polyamide ratio is at least about 0.1:1.

5. The process of claim 1 in which said liquid formaldehyde is added to said viscous paste slowly with agitation over a period of time to saturate the resulting gelatinous material.

6. The process of claim 1 in which said gelatinous material is cured under essentially atmospheric conditions for a period of time between about ½ and about 1½ hours.

7. The process of claim 1 in which residual chemicals remaining in said membrane are extracted therefrom by leaching thereof in relatively cold water.

8. A process of preparing a rigid water insoluble polyamide foam which comprises: admixing a crystalline linear and long chain high molecular weight polyamide and a concentrated solution of zinc chloride in hydrochloric acid to form a gum-like solid material and a supernatant liquid, admixing solid formaldehyde-containing material selected from the group consisting of 1, 3, 5 trioxane and paraformaldehyde and said gum-like solid material to form a homogeneous, light and flowable paste, curing said paste in a suitable molding zone thereby forming rigid, water insoluble, polyamide foam of desired shape and size.

9. The process of claim 8 in which said molding is maintained under essentially atmospheric conditions, and said paste is maintained under weakly acidic water.

* * * * *